July 4, 1961 P. W. ZIEGENBEIN 2,990,988
CONNECTING DEVICE FOR SECURING A WRIST BAND TO A WATCH
Filed Oct. 16, 1958
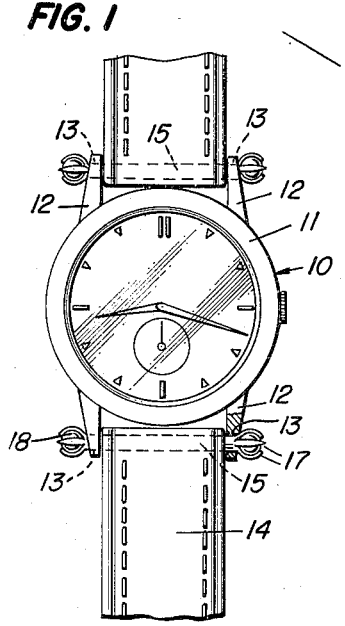
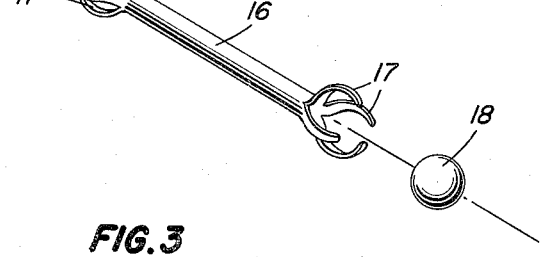
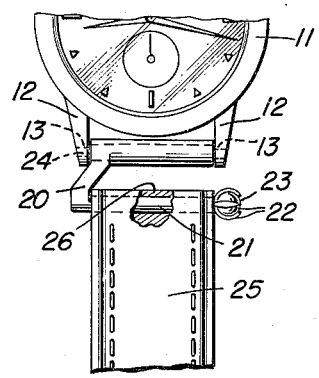
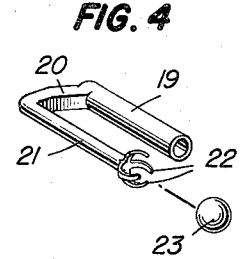
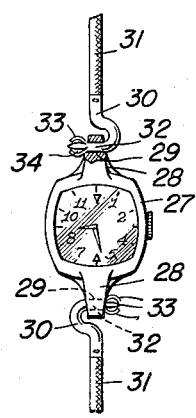
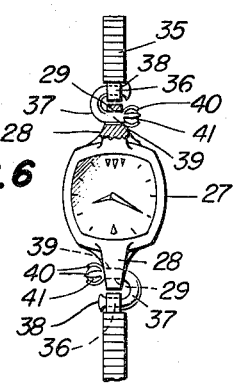
INVENTOR
Paul W. Ziegenbein
BY B. P. Fishburne, Jr.
ATTORNEY United States Patent Office 2,990,988
Patented July 4, 1961

2,990,988
CONNECTING DEVICE FOR SECURING A WRIST BAND TO A WATCH
Paul W. Ziegenbein, 1012 S. 2nd St., Norfolk, Nebr.
Filed Oct. 16, 1958, Ser. No. 767,737
2 Claims. (Cl. 224—4)

My invention relates to a connecting device for securing a wrist band to a watch.

An important object of the invention is to provide a device of the above-mentioned character which may be conveniently operated for connecting or disconnecting the wrist band with or from the watch.

A further object of the invention is to provide a device of the above-mentioned character which is highly ornamental in appearance.

A further object of the invention is to provide a device of the above-mentioned character which is of simple construction and may be manipulated without the use of tools.

Other objects and advantages of the invention will be apparent during the course of the following description.

In the accompanying drawings forming a part of this application and in which like numerals are employed to designate like parts throughout the same, FIGURE 1 is a plan view of the connecting device associated with a watch and wrist band.

FIGURE 2 is an exploded perspective view of the pin and balls included in the connecting device.

FIGURE 3 is a plan view of a connecting device embodying a second form of the invention.

FIGURE 4 is an exploded perspective view of the connecting element and ball included in the connecting device.

FIGURE 5 is a plan view of a watch and connecting devices showing a third form of the invention, and FIGURE 6 is a plan view of a watch and connecting devices showing a fourth form of the invention.

In the drawings, attention being called first to FIGURES 1 and 2, the numeral 10 designates a wrist watch of any well-known or preferred type, including a casing 11, provided with oppositely arranged pairs of lugs 12, rigidly secured thereto. Each lug 12 has a cylindrical opening 13 formed therein.

The numeral 14 designates a wrist band which may be formed of leather, plastics, metal or any suitable material. This wrist band is provided at its opposite ends with apertured elements or sleeves 15, which are in the nature of tubes.

The numeral 16 designates a connecting element or pin which may be formed of metal or other suitable material. Formed integral with the opposite ends of the pin 16 are resilient claws or prongs 17, which are longitudinally curved, extend generally longitudinally of the pin 16 and project radially beyond the same. These resilient claws are adapted to be readily spread for receiving a ball 18 or like element. If desired, this ball could be in the form of an ornament or gem, real or artificial, such as a pearl, diamond or the like.

As shown in FIGURE 1, one element or ball 18 may be first inserted within the resilient claws or prongs 17, which will properly detachably hold the ball. The opposite end of the pin 16 is now passed through the opening 13 in one lug 12, since the claws 17 can be readily compressed and this end of the pin is also passed through the sleeve 15 and through the opening 13 in the other lug 12. When the claws 17 become arranged outwardly of the opening 13, these claws 17 will expand and the ball 18 may be inserted inwardly of the claws 17 and will be held therein. The ball 18 has a larger diameter than the opening 13, and when the ball 18 is held in position by the claws, the ball and claws prevent the pin 16 being separated from the lug 12. It is obvious that the opposite ends of band 14 are secured to the pairs of lugs 12 by the pins 16 and when the balls 18 are held within the claws, the pins cannot be separated from the lugs. Since the claws are resilient, the balls 18 may be removed from within the claws, to permit of the removal of the pin and its reinsertion within the openings 13 of the lugs 12.

In FIGURES 3 and 4, I have shown a second form of the invention. In FIGURE 3, the watch casing 11 is provided with the same lugs 12, having openings 13. In this form of the invention, the connecting element includes a sleeve 19, having an arm 20 formed integral therewith, at one end. This arm 20 carries a pin 21, having resilient claws 22, corresponding to the resilient claws 17. 23 is a ball or expanding element.

In this form of the invention, the sleeve 19 is arranged between the lugs 12, and the pin 24 is passed through the openings 13 and the sleeve 19. The ends of the pin 24 may be spread to hold the pin in place. The pin 21 may be regarded as permanently secured to the watch casing 11. The numeral 25 designates a wrist band, corresponding to the wrist band 14, and having a tubular element or sleeve 26. This sleeve 26 detachably receives the element or pin 21. Since the claws 22 are resilient and compressible, they may be passed with the pin 21 through the sleeve 26, and when the claws 22 are arranged exteriorly of the sleeve 26, the ball 23 is inserted within the resilient claws 22 to be detachably held thereby. These claws 22 and ball 23 have a larger diameter than the internal diameter of the sleeve 26, and normally hold the sleeve 26 upon the pin 21, but the sleeve may be removed by removing the ball from within the claws 22. While I have shown only one end of the wrist band 25 secured to the watch casing 11 by the means including the pin 21, it is obvious that the opposite end of the wrist band is secured to the watch casing by the identical means.

In FIGURE 5 I have shown a modification embodying a third form of the invention. In this figure, the numeral 27 designates a watch casing, having lugs 28 provided with openings 29. The numeral 30 designates connecting elements in the form of hooks, the other ends of which are secured to the ends of the wrist band 31 by any suitable means. Each hook 30 includes a transverse portion or pin 32, provided at its free end with resilient claws 33 formed integral therein. These claws are identical with the claws 17. The claws 33 receive a ball 34, identical with the ball 18.

In use, when the ball 34 is removed from within the claws 33, the claws and pin 32 may be passed through the opening 29. When the claws are arranged exteriorly of the opening 29, the ball 34 is again inserted within the claws 33. The ball 34 and claws 33 have a larger diameter than the opening 29 and therefore retain the pin 32 within the opening 29. When the ball is removed the claws 33 being resilient may be compressed and the pin 32 withdrawn from the opening 29.

In FIGURE 6 I have shown a fourth modification of my invention wherein the numeral 35 designates a metallic wrist band, having a sleeve 36 at each end. A U-shaped connecting element 37 is provided, one arm of which extends through the sleeve 36 and has its end spread at 38. The opposite arm is in the form of a pin 39, corresponding to the pin 32, and this arm carries resilient claws 40, corresponding to the claws 33. The claws 40 receive a ball 41. The watch casing 27 is identical with that shown in FIGURE 5, and has the lugs 28, provided with the openings 29. The pins 39 extend through the openings 29, and are held in these openings by the claws 40 and ball 41 which have a larger diameter than the openings 29.

The watch casing 11 in FIGURES 1 and 3 has its periphery provided with lugs 12 extending beyond such periphery. The lugs 12 have openings 13 which extend generally tangentially of the edge or periphery of casing 11. In FIGURE 5, the lugs 28 are secured to the edge or periphery of the watch casing and these lugs extend generally radially beyond the periphery. The lugs 28 have openings 29 which extend generally along the periphery of the casing. The same lugs 28 and openings 29 and the same arrangement is present in FIGURE 6.

It is to be understood that the forms of my invention herewith shown and described are to be taken as preferred examples of the same and that various changes in the shape, size and arrangement of parts may be resorted to, without departing from the spirit of my invention or the scope of the subjoined claims.

Having thus described my invention, I claim:

1. Means for connecting a watch casing and band, said casing having lugs provided with transverse apertures, said means comprising generally U-shaped connecting elements, each connecting element including outer and inner pins, the outer pins being secured to the ends of said band, the inner pins extending transversely of the band and inserted within said apertures, resilient claws carried by the free ends of the inner pins and forming sockets having an exterior diameter which is normally larger than the apertures but compressible to pass through said apertures, and solid objects inserted within the sockets when said inner pins extend through said apertures and said sockets protrude therefrom.

2. Means for connecting a watch casing having lugs provided with transverse apertures and band having transverse pin receiving sleeves, said means comprising generally U-shaped connecting elements, each connecting element including outer and inner pins, the outer pins being held within said sleeves, the inner pins extending transversely of said band and inserted within said apertures, resilient claws carried by the free ends of the inner pins and forming sockets having an exterior diameter which is normally larger than the apertures but compressible to pass through said apertures, and solid objects inserted within the sockets when said inner pins extend through said apertures and said sockets protrude therefrom.

References Cited in the file of this patent

UNITED STATES PATENTS

| | | |
|---|---|---|
| 1,044,354 | Collett | Nov. 12, 1912 |
| 1,114,998 | Love | Oct. 27, 1914 |
| 1,498,109 | Mulholland | June 17, 1924 |
| 1,653,535 | Bonhajo | Dec. 20, 1927 |

FOREIGN PATENTS

| | | |
|---|---|---|
| 968,346 | France | Apr. 19, 1950 |